J. H. Balsley
Step Ladder.
No. 2,010. Reissued Jun. 27. 1865.
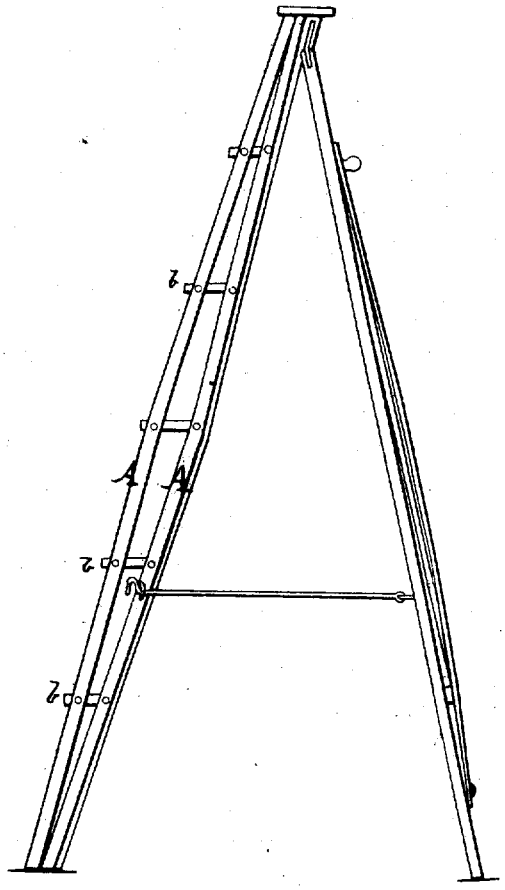
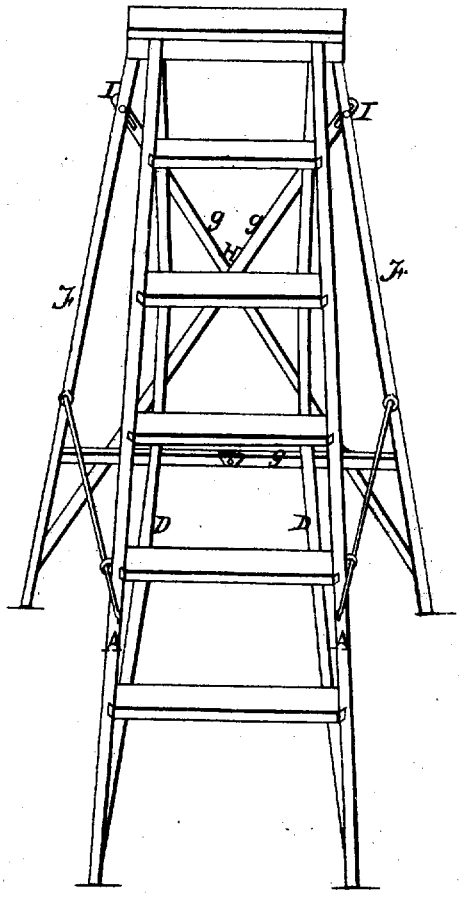
Witnesses:
Chas. A. Alexander
Charles Alexander
Wm. H. Bates
Inventor:
Jno. H. Balsley

UNITED STATES PATENT OFFICE.

JOHN H. BALSLEY, OF DAYTON, OHIO.

STEP-LADDER.

Specification forming part of Letters Patent No. 34,100, dated January 7, 1862; Reissue No. 2,010, dated June 27, 1865.

*To all whom it may concern:*

Be it known that I, J. H. BALSLEY, of the town of Dayton and State of Ohio, have invented certain new and useful Improvements in Step-Ladders; and I do hereby declare that the following is a full, clear, and exact description of the same, reference being had to the accompanying drawings and the letters of reference marked thereon.

In the annexed drawings, making part of this specification, A A represent the supports to which the steps are attached. These supports rest on each other at their ends, but gradually recede as they approach the center, forming an elongated ellipsis.

*b b* represent the steps which are let into the supports sufficiently deep to give them strength, and are also secured in their position by nails driven into their ends through the supports. In order to give additional solidity to the steps the braces D D in Figure 2 are securely fastened to the supports A A, and, being slightly curved, are made to rest against the backs of the steps, and are firmly nailed to them.

F F represent two adjustable supports, which, with other pieces, to be described, form the back of the ladder, said supports being hinged to the tops or to a block secured to the tops of supports A A, said hinges being inserted in the ends of the supports F F and in the lower side of block *a* by hinges, so as to be folded up or extended at pleasure. G is a cross tie or brace of F F, hinges in the middle. When the ladder is put in condition to be used, this cross-tie is extended at full length and throws out the supports at the bottom, thereby giving them greater strength and solidity.

The supports F F have two braces, *g g*, passing from bottom to top and intersecting each other at the point H. These braces are confined to the supports at the points I I, each having a slat with a pin through it, by the means of which they can be drawn up or lengthened to suit the change of position in the supports.

To keep the front of the ladder when used at the proper distance from the back there are two metallic rods extending horizontally from A A to F F. These rods are hinged to support F F, and pass through staples in A A, and, being hooked at the end, rest securely in the staples and answer as braces when the ladder is in use; but when folded up the rods are raised until the hooks are disengaged from the staples, and will then pass through them, falling down in a line with the supports A A, and thus be entirely out of the way.

Having thus fully described my invention, what I claim as new, and desire to secure by Letters Patent, is—

1. The supports A A, made of strips, whose ends are connected together, forming between them an elongated ellipsis, as and for the purpose specified.

2. The braces D D, in connection with the supports A A and steps *b b*, to give strength laterally, as is specified.

3. The jointed cross-piece G and slotted rods *g g*, for adjusting the supports F F laterally, as herein specified.

JOHN H. BALSLEY.

Witnesses:
WM. CRAIGHEAD,
GEO. N. HOUK.